(12) United States Patent
Wehrung et al.

(10) Patent No.: US 11,095,693 B1
(45) Date of Patent: Aug. 17, 2021

(54) RECOMMENDATIONS BASED ON IN-SESSION COMMUNICATIONS

(71) Applicant: Fuze, Inc., Boston, MA (US)

(72) Inventors: Clement Wehrung, Boston, MA (US); Luke Surazski, Boston, MA (US)

(73) Assignee: Fuze, Inc., Boston, MA (US)

( * ) Notice: Subject to any disclaimer, the term of this patent is extended or adjusted under 35 U.S.C. 154(b) by 0 days.

(21) Appl. No.: 16/789,002

(22) Filed: Feb. 12, 2020

(51) Int. Cl.
*H04L 29/06* (2006.01)
*H04L 29/08* (2006.01)
*H04L 12/58* (2006.01)

(52) U.S. Cl.
CPC ........ *H04L 65/1093* (2013.01); *H04L 51/043* (2013.01); *H04L 65/1089* (2013.01); *H04L 65/80* (2013.01); *H04L 67/24* (2013.01)

(58) Field of Classification Search
CPC . H04L 65/1093; H04L 65/1089; H04L 65/80; H04L 51/043; H04L 67/24
See application file for complete search history.

(56) References Cited

U.S. PATENT DOCUMENTS

| | | | | |
|---|---|---|---|---|
| 7,170,886 B1* | 1/2007 | Surazski | ........... | H04L 29/06027 370/352 |
| 10,645,088 B1* | 5/2020 | Yanes | ................. | H04L 63/1425 |
| 10,798,191 B1* | 10/2020 | Walter | .................. | H04L 67/146 |
| 10,834,147 B1* | 11/2020 | Wehrung | ............ | H04L 65/1006 |
| 2018/0367483 A1* | 12/2018 | Rodriguez | ............ | H04L 51/046 |
| 2019/0372902 A1* | 12/2019 | Piersol | .................. | H04L 47/283 |
| 2020/0126440 A1* | 4/2020 | Sindhgatta | .............. | G06F 40/56 |
| 2020/0311739 A1* | 10/2020 | Chopra | ................. | G06F 16/353 |
| 2020/0336443 A1* | 10/2020 | Pottier | ................... | H04L 51/34 |

* cited by examiner

*Primary Examiner* — June Y Sison
(74) *Attorney, Agent, or Firm* — McDermott Will & Emery LLP

(57) ABSTRACT

Methods and systems for recommending events during a media session are provided. In one aspect, a method includes monitoring communication streams of the session and analyzing data of the streams to detect at least one intent and at least one entity. The method includes determining, responsive to detecting the at least one intent, whether the at least one intent is a question or a task, and includes identifying, responsive to determining that the at least one intent is the question is associated with the at least one entity, presence information associated with the at least one entity. The method includes transmitting, during the session, responsive to determining that the at least one intent is the question associated with the at least one entity and based on the presence information, an in-session recommendation to initiate an event associated with the at least one entity. Systems and machine-readable media are also provided.

17 Claims, 7 Drawing Sheets

300B

```
From 321 in
FIG. 3A
```

350
Transmit, at an end of the media session and based on detecting the at least one entity, a target recommendation to selectively share the content with the at least one entity

352

354
Transmit, when the at least one entity is selected in the target recommendation, the content to the at least one entity End

FIG. 3B

RECOMMENDATIONS BASED ON IN-SESSION COMMUNICATIONS

TECHNICAL FIELD

The present disclosure generally relates to media session systems, and more specifically relates to improving such media sessions.

BACKGROUND

Collaborative real-time media sessions can facilitate communication between members of a group to further advance topics of projects. In some instances, however, problems and/or questions are discussed during the real-time media session, but are not addressed because the participants are unable to answer or provide solutions to the problems. Often times, in these instances, another media session is scheduled to address the problem and/or question, which may delay the project and require additional resources.

The description provided in the background section should not be assumed to be prior art merely because it is mentioned in or associated with the background section. The background section may include information that describes one or more aspects of the subject technology.

SUMMARY

The disclosed systems and methods leverage communications history such as, but not limited to, chat, voice, video conferences, and shared content and utilizes real-time analysis to identify questions, possible answers, and tasks during a real-time media session. The disclosed systems and methods can identify such questions, possible answers, and tasks to tag skills, topics, and names identified during the media session. The disclosed systems and methods provide real-time recommendations, during the media session, to invite entities (e.g., people, groups) to join the media session based on the questions that are identified. Moreover, the real-time recommendation to invite a particular entity is based on presence information associated with that particular entity. For example, if the presence information indicates that the entity is not available, then a real-time recommendation may not be made to invite that particular entity.

The disclosed systems and methods also provide, at the end of the media session, a list (e.g., a target recommendation) recommending entities, who are identified during the media session, as being potential entities to share the content and/or collateral (e.g., recording, presentation) of the media session. The content and/or collateral will be transmitted to the potential entities that are selected from the list. In certain aspects, the disclosed systems and methods also generate, at the end of the media session, a group chat that includes the participants of the media session as well as other entities that were identified during the media session.

The disclosed methods and systems provide for recommending events during a media session between end users. According to certain aspects of the present disclosure, a computer-implemented method is described that includes monitoring communication streams of the media session between the end users. The computer-implemented method also includes analyzing data of the communication streams to detect an intent of at least one of the end users, and an entity identified by at least one of the end users. The computer-implemented method also includes determining, in response to detecting the intent, whether the intent is a question associated with the entity. The computer-implemented method also includes identifying, in response to determining that the intent is the question, presence information associated with the entity. The computer-implemented method also includes transmitting an in-session recommendation to initiate an event associated with the entity during the media session between the end users in response to determining that the intent is the question associated with the entity, and based on the presence information of the entity.

According to certain aspects of the present disclosure, a system for recommending events during a media session between end users is provided that includes a memory comprising instructions and one or more processors configured to execute the instructions to monitor communication streams of the media session between the end users. The one or more processors are also configured to execute instructions to process data of the communication streams of the media session. The one or more processors are also configured to execute instructions to index content identified from the data of the communication streams that is processed during the media session between the end users. The one or more processors are also configured to execute instructions to analyze the data of the communication streams that is processed to detect an intent of at least one of the end users, and an entity identified by at least one of the end users. The one or more processors are also configured to execute instructions to determine, in response to detecting the intent, whether the intent is a question or a task associated with the entity. The one or more processors are also configured to execute instructions to identify, in response to determining that the intent is the question, presence information associated with the entity. The one or more processors are also configured to execute instructions to transmit an in-session recommendation to initiate an event associated with the entity during the media session between the end users in response to determining that the intent is the question associated with the entity, and based on the presence information of the entity. The one or more processors are also configured to execute instructions to transmit, at an end of the media session between the end users and based on detecting the entity identified by at least one of the end users, a target recommendation to share the content with the end users of the media session and the entity.

In yet another aspect, a non-transitory machine-readable storage medium comprising machine-readable instructions for causing one or more processors to execute operations for recommending events during a media session between end users. The operations include monitoring communication streams of the media session between the end users. The operations include processing data of the communication streams of the media session. The operations include indexing content identified from the data of the communication streams that is processed during the media session between the end users. The operations include analyzing the data of the communication streams that is processed to detect at an intent of at least one of the end users, and an entity identified by at least one of the end users. The operations include determining, in response to detecting the intent, whether the intent is a question. The operations include identifying, in response to determining that the intent is the question, presence information associated with the entity. The operations include transmitting an in-session recommendation to initiate an event associated with the entity during the media session between the end users in response to determining that the intent is the question associated with the entity, and based on the presence information of the entity. The operations transmitting, when the in-session recommendation is selected to initiate the event associated with the entity, a request notification to the entity to join the media session. The operations include transmitting, at an end of the media session between the end users and based on detecting the entity identified by at least one of the end users, a target recommendation to share the content with the end users of the media session and the entity.

In yet another aspect, a system for recommending events during a media session between end users is described that includes a means for monitoring communication streams of the media session between the end users. The means for monitoring also includes analyzing data of the communication streams to detect an intent of at least one of the end users, and an entity identified by at least one of the end users. The means for monitoring also includes determining, in response to detecting the intent, whether the intent is a question associated with the entity. The means for monitoring also includes identifying, in response to determining that the intent is the question, presence information associated with the entity. The means for monitoring also includes transmitting an in-session recommendation to initiate an event associated with the entity during the media session between the end users in response to determining that the intent is the question associated with the entity, and based on the presence information of the entity.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments.

In the drawings:

FIG. 3B illustrates an example process that continues from the example process of FIG. 3A using the example server(s) of FIG. 2.

Figure 1:
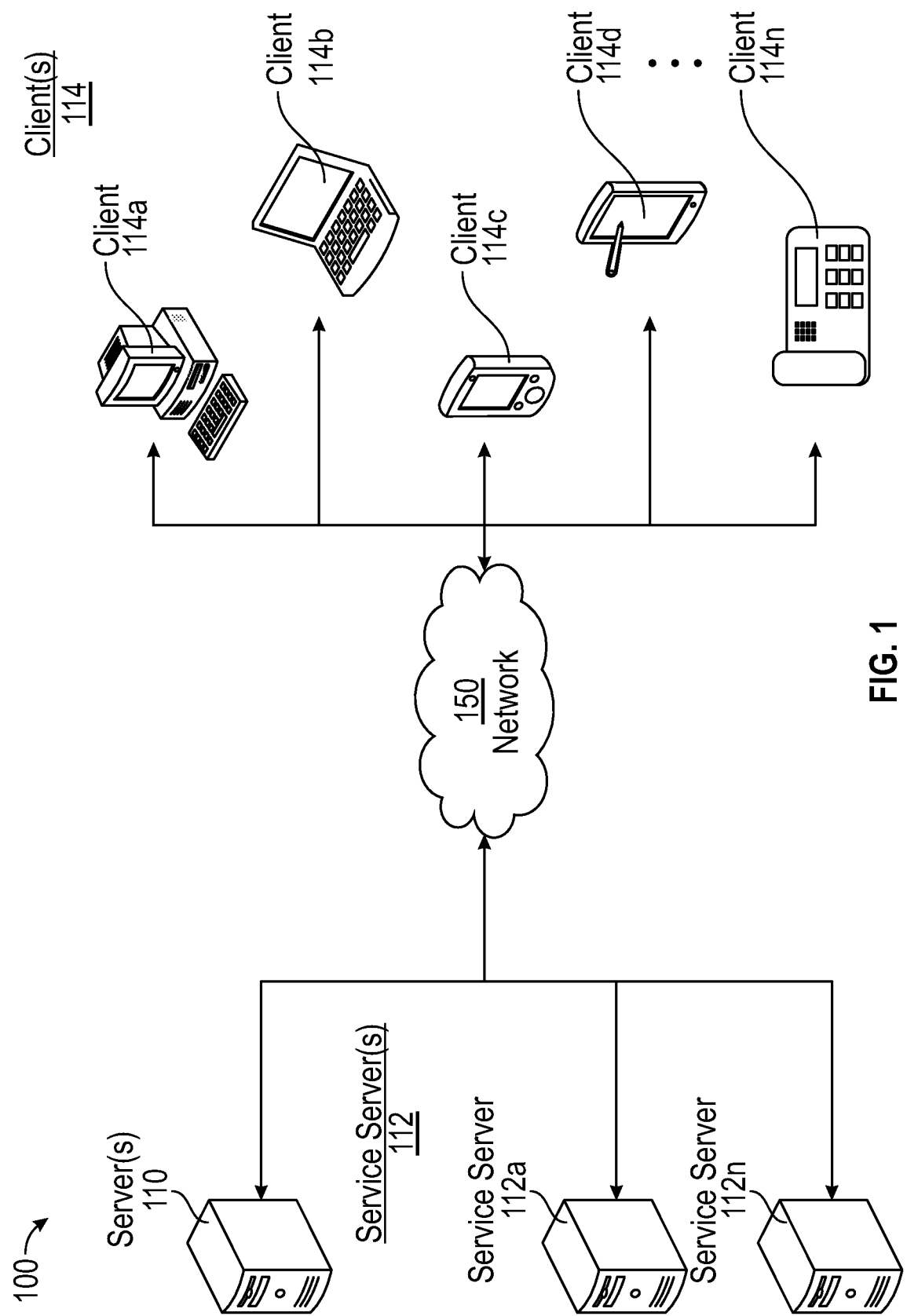
FIG. 1 illustrates an example architecture for recommending events during a media session between end users, according to certain aspects of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed system can monitor all communication streams during a real-time media session and identify entities who are discussed during the media session. The identified entities are recommended to be invited to join the media session to potentially answer a question that is also identified during the media session. An identified entity is recommended based on various factors associated with the identified entity including, but not limited to, presence information, zip code, time, zone, calendar information, skill level, topic of the media session, hierarchy, preferred communication, interests, past experience, and other factors. The recommendation to invite the identified entity is presented in real-time during the media session to quickly facilitate answering the identified question.

In certain aspects, the disclosed system can also leverage the monitored communication streams of the media session to recommend asynchronously (e.g., after the media session has concluded) sharing content and/or collateral of the media session with participants and entities identified during the media session. For example, the disclosed system can, at the end of the media session, present a list that recommends sharing the content and/or collateral of the media session with the participants and/or entities identified during the media session. The content and/or collateral can be shared with the participants and entities that are selected.

The disclosed system provides an improvement to computer functionality that is integrated into a practical application. The disclosed system addresses a technical problem tied to computer technology and arising in the realm of computer networks, namely the technical problem of inefficient bandwidth usage of network resources during a media session. The disclosed system solves this technical problem by providing in-session recommendations to invite an entity to join the currently ongoing media session to alleviate roadblocks of the media session and to quickly facilitate the conclusion of the media session. As such, the disclosed system provides at least the technical effect of improving bandwidth usage during real-time media sessions.

Example System Architecture

FIG. 1 illustrates an example architecture 100 for recommending events during a media session between end users. The architecture 100 includes one or more servers 110, a plurality of service servers 112, and one or more clients 114 connected over a network 150.

The one or more servers 110 is configured to host a recommendation service 210, such as, for example, a service for recommending events during a media session between the one or more clients 114. The media session may include real-time interactive communication methods of media including, but not limited to, audio calls, video conferencing, screen sharing, real-time chat, and combinations thereof. The one or more servers 110 may be any device comprising an appropriate processor, memory, and communications capability for hosting the recommendation service 210. For purposes of load balancing, the one or more servers 110 may include multiple servers to host the recommendation service 210. For example, in certain aspects, the recommendation service 210 can be hosted on separate servers. In certain aspects, the one or more of the servers 110 can be a cloud-computing server of an infrastructure-as-a-service (IaaS), and be able to support a system-as-a-service (PaaS) and software-as-a-service (SaaS) services.

Each service server, including service server 112a . . . 112n, of the plurality of service servers 112 is configured to host a service 212, such as, for example, an audio conferencing service, a meetings/collaboration service, a calendar service, a meeting reminder service, a direct inward dialing number (DID) lookup/contact database service, a presence service, and other well-known services in the industry. The plurality of service servers 112, including the service server 112a, may be any device comprising an appropriate processor, memory, and communications capability for hosting the service 212. For purposes of load balancing, each service server of the plurality of service servers 112 may include multiple servers to host the service 212. For example, in certain aspects, the service 212 of each server of the plurality of servers 112 can be hosted on separate servers. In certain aspects, the plurality of service servers 112 can be a cloud-computing server of an infrastructure-as-a-service (IaaS), and be able to support a system-as-a-service (PaaS) and software-as-a-service (SaaS) services.

As used herein, the term "audio conferencing service" refers generally to where an audio component of a meeting/conference/collaboration session/media session is hosted and the media of all participants is mixed.

As used herein, the term "meetings/collaboration service" refers generally to one or more services that work in concert with the audio conferencing service to provide video and/or screen share capabilities for a collaboration/meeting experience. This service may also track how audio legs of the audio conferencing service correspond to video/collaboration sessions.

As used herein, the term "calendar service" refers generally to a service that is responsible for managing the scheduling of meetings/conferences/collaboration sessions/media sessions. It may be a calendar/scheduling component internal to a meeting service, some other component of an unified communications as a service (UCaaS) platform, or an adapter service that integrates with a third party calendar service, such as those from the Google and Microsoft productivity suites. Either directly or through an adapter service, it also may provide for the ability of an application program interface (API) client to subscribe to events related to a scheduled meeting, such as scheduled meeting time reached, scheduled end time reached, etc. Events may be in the form of a push notification that includes an identifier for a specific calendar item, an owner, start and end times, etc.

As used herein, the term "meeting reminder service" refers generally to a service that is responsible for triggering reminders/notifications to end-users for upcoming meetings. It may work in conjunction with the calendar service.

As used herein, the term "direct inward dialing number (DID) lookup/contact database service" refers generally to a lookup service capable of searching for contact information (e.g., name, company, etc.) based on a DID (e.g., phone number) of a caller. It may take a variety of forms such as, including but not limited to, white pages, an enterprise customer relationship management (CRM), etc. It may also be an adapter or aggregator to multiple services that may return search results. It may also resolve email addresses and/or full names based on caller ID information.

As used herein, the term "presence service" refers generally to a component of a UCaaS platform that may track user state information such as presence states explicitly set by the user (e.g., available, busy, do not disturb (DND), unavailable, etc.) in UCaaS endpoint/collaboration software, presence states triggered by UCaaS platform usage (e.g., in a meeting, on a call, etc.). It may also track a user state through calendar information (e.g., user is a participant in a scheduled meeting, business/working hours, etc.), and user location based on recent activity on specific endpoints, which may be associated with specific physical locations based on IP address and/or e911 registration, as well as GPS data from mobile endpoints. It may also detect that the user is in a moving vehicle and/or driving based on information gathered by a mobile endpoint.

The one or more clients 114, including, for example, clients 114a, 114b, 114c, 114d, . . . 114n, can be any suitable device that may perform audio and/or video communications such as, but not limited to, desktop computers, mobile computers, tablet computers (e.g., including e-book readers), mobile devices (e.g., a smartphone or PDA), desktop phones, Public Switch Telephone Network (PSTN) phones, Voice over Internet Protocol (VoIP) phones, and/or other devices having appropriate embedded processor, memory, and communications capabilities for accessing resources on the network 150. Each client of the one or more clients 114 is configured to host a web application 214 (see FIG. 2) or a mobile application 216 (see FIG. 2). The one or more clients 114 may include touchscreens, pen digitizers, or other devices for receiving input from the hands of end users such as a first end user 218 and a second end user 220 (see FIG. 2).

The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like. The network 150 may be wired or wireless.

Example Recommender System

Figure 2:
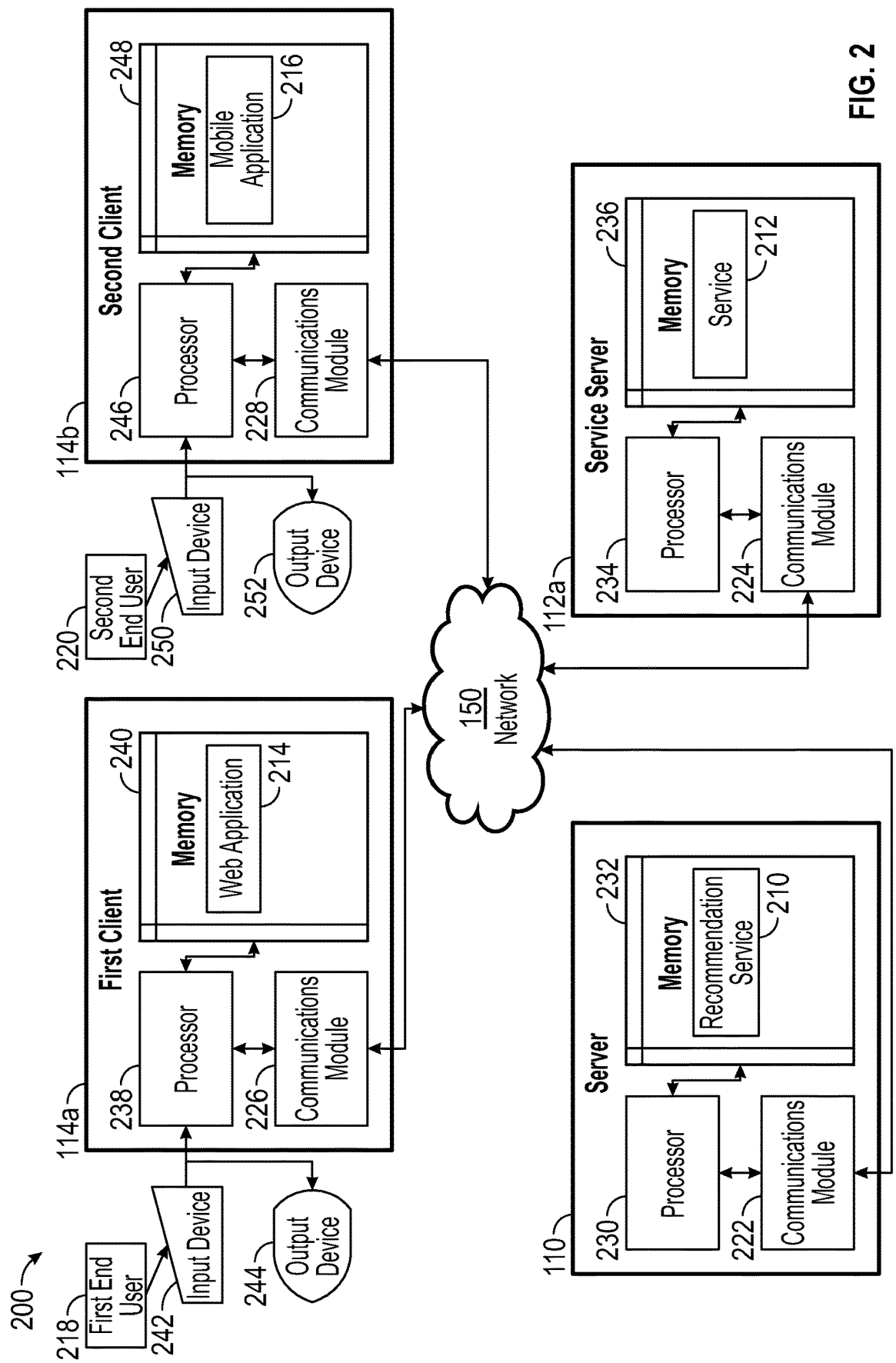
FIG. 2 is a block diagram illustrating an example server(s) and client(s) from the architecture of FIG. 1, according to certain aspects of the disclosure.

FIG. 2 is a block diagram illustrating an example system 200 comprising the one or more servers 110, and the plurality of service servers 112, such as the service server 112a, and the one or more clients 114, such as the first client 114a and the second client 114b, shown in the architecture 100 of FIG. 1, according to certain aspects of the disclosure.

In this example, the one or more servers 110, the service server 112a, the first client 114a, and the second client 114b can be connected over the network 150 via respective communications modules 222, 224, 226, 228. The communications modules 222, 224, 226, 228 are configured to interface with the network 150 to transmit and receive information, such as data, requests, responses, and commands to other devices on the network 150. In certain aspects, the communications modules 222, 224, 226, 228 can be, for example, modems, Ethernet cards, and/or other suitable communications hardware/software.

The one or more servers 110 includes a processor 230, the communications module 222, and a memory 232 that includes the recommendation service 210. The processor 230 of the one or more servers 110 is configured to execute instructions, such as instructions physically coded into the processor 230, instructions received from software in the memory 232, instructions delivered from a remote memory, or a combination thereof. In general, the processor 230 of the one or more servers 110 is configured to monitor, transmit, and/or receive data from the plurality of service servers 112, the one or more clients 114, and other devices on the network 150. For example, the processor 230 of the one or more servers 110 can be configured to receive user input, such as from the first end user 218 and the second end user 220, for example, accessing the recommendation service 210 over the network 150 using either the web application 214 hosted on the first client 114a or the mobile application 216 hosted on the second client 114b. The processor 230 of the one or more servers 110 is configured to execute instructions from the recommendation service 210 to monitor communication streams 312 (see FIG. 3A) of a media session 314 (see FIG. 3A) between, for example, the first end user 218 via the first client 114a and the second end user 220 via the second client 114b.

The processor 230 of the one or more servers 110 is also configured to execute instructions from the recommendation service 210 to process data 320 (see FIG. 3A) of the communication streams 312. In certain aspects, the data 320 is audio data and is processed using speech-to-text processing to convert the audio data into text data. In certain aspects, the data 320 is processed or converted to Portable Document Format (PDF). The processor 230 of the one or more servers 110 is also configured to execute instructions from the recommendation service 210 to index content 316 (see FIG. 3A) identified from the data 320 of the communication streams 312 that is processed during the media session 314.

Figure 3A:
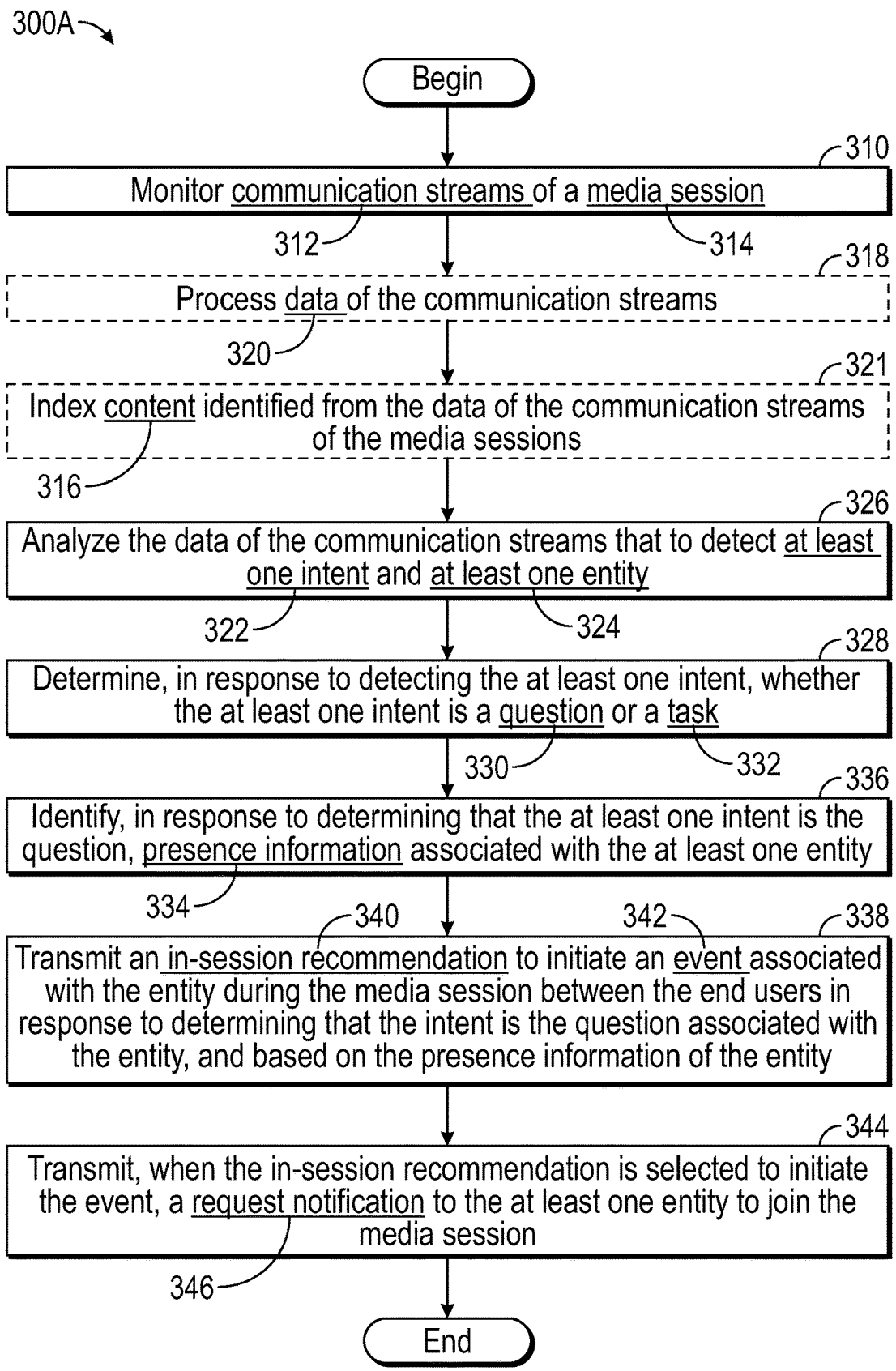
FIG. 3A illustrates an example process for recommending events during a media session between end users using the example server(s) of FIG. 2.
Figure 4A:
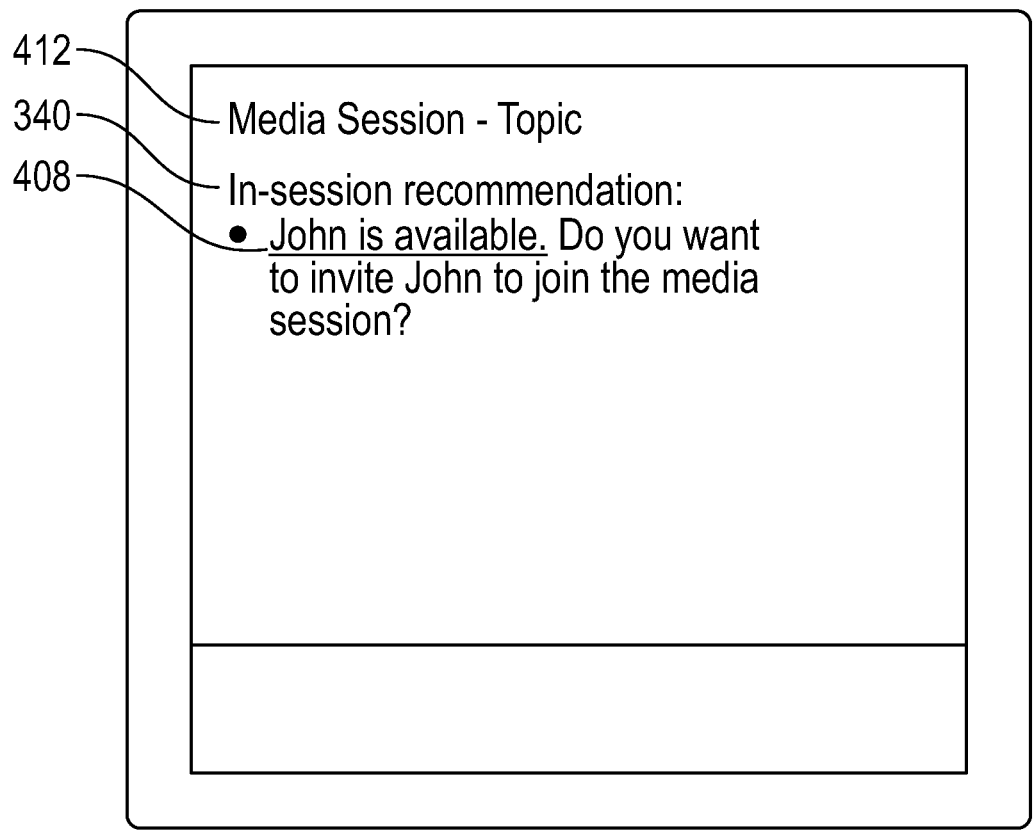
FIGS. 4A-4D are example illustrations associated with the example processes of FIGS. 3A-3B.

The processor 230 of the one or more servers 110 is also configured to execute instructions from the recommendation service 210 to analyze the data 320 of the communication streams 312 that is processed to detect at least one intent 322 (see FIG. 3A) and at least one entity 324 (see FIG. 3A). In certain aspects, analyzing the data 320 is performed with natural language processing and/or machine learning. The processor 230 of the one or more servers 110 is also configured to execute instructions from the recommendation service 210 to determine, in response to detecting the at least one intent 322, whether the at least one intent 322 is a question 330 (see FIG. 3A) or at least one task 332 (see FIG. 3A). In certain aspects, determining whether the at least one intent 322 is the question 330 or the at least one task 332 is performed with natural language processing and/or machine learning. The processor 230 of the one or more servers 110 is also configured to execute instructions from the recommendation service 210 to identify, in response to determining that the at least one intent 322 is the question 330, presence information 334 (see FIG. 3A) associated with the at least one entity 324. The at least one entity 324 can include an individual person, a group of people, and other types of entities. The processor 230 of the one or more servers 110 is also configured to execute instructions from the recommendation service 210 to transmit, during the media session 314, in response to determining that the at least one intent 322 is the question 330 and based on the presence information 334 of the at least one entity 324, an in-session recommendation 340 (see FIG. 3A) to selectively initiate an event 342 (see FIG. 3A) associated with the at least one entity 324. In certain aspects, transmitting the in-session recommendation 340 to selectively initiate the event 342 associated with the at least one entity 324 is based on identifying that the presence information 334 indicates a presence state 408 (see FIG. 4A) of available for the at least one entity 324.

In certain aspects, the processor 230 of the one or more servers 110 is also configured to execute instructions from the recommendation service 210 to transmit, when the in-session recommendation 340 is selected to initiate the event 342, a request notification 346 (see FIG. 3A) to the at least one entity 324 to join the media session 314. In certain aspects, the request notification 346 includes context 410 (see FIG. 4B), that is based on the at least one intent 322, detailing or explaining the reason for requesting the at least one entity 324 to join the media session 314. In certain aspects, the request notification 346 includes an option 412 (see FIG. 4B) for the at least one entity to respond to the request notification 346 instead of joining the media session 314.

In certain aspects, the processor 230 of the one or more servers 110 is configured to execute instructions from the recommendation service 210 to index the data 320 of the communication streams 312 that is processed. In certain aspects, the processor 230 of the one or more servers 110 is configured to execute instructions from the recommendation service 210 to identify, in response to determining that the at least one intent 322 is the at least one task 332 and based in part on the presence information 334, whether the at least one entity 324 is associated with the at least one task 332. In certain aspects, the processor 230 of the one or more servers 110 is configured to execute instructions from the recommendation service 210 to transmit, at an end of the media session 314 and based on detecting the at least one entity 324 by at least one of the end users, a target recommendation 352 (see FIG. 3B) to selectively share the content with the end users (e.g., the first end user 218, the second end user 220) of the media session and the at least one entity 324. In certain aspects, the processor 230 of the one or more servers 110 is configured to execute instructions from the recommendation service 210 to transmit, at an end of the media session 314 and in response to identifying that the at least one entity 324 is associated with the at least one task 332, the target recommendation 352 to share the content with the at least one entity 324. In certain aspects, the processor 230 of the one or more servers 110 is configured to execute instructions from the recommendation service 210 to transmit, when the at least one entity 324 is selected in the target recommendation 352, the content 316 to the at least one entity 324. In certain aspects, the processor 230 of the one or more servers 110 is configured to execute instructions from the recommendation service 210 to generate, at the end of the media session 314 and in response to identifying that the at least one entity 324 is associated with the at least one task 332, a group chat 414 comprising the participants of the media session 314 and the at least one entity 324. In certain aspects, the processor 230 of the one or more servers 110 is configured to execute instructions from the recommendation service 210 to transmit the content 316 to the group chat 414. In certain aspects, the target recommendation 352 includes a summary 416 of the media session 314 detailing key moments identified during the media session 314 based on analyzing the data 320 of the communication streams 312 that is processed.

With respect to each service server of the plurality of service servers 112, as an example, the service server 112a includes a processor 234, the communications module 224, and a memory 236 that includes the service 212. The processor 234 of the service server 112a is configured to execute instructions, such as instructions physically coded into the processor 234, instructions received from software in the memory 236, instructions delivered from a remote memory, or a combination thereof. In general, the processor 234 of the service server 112a is configured to monitor, transmit, and/or receive data from the one or more servers 110, the one or more clients 114 and other devices on the network 150. For example, the processor 234 of the service server 112a can be configured to receive user input, such as from the first end user 218 and the second end user 220, for example, accessing the service 212 over the network 150 using either the web application 214 hosted on the first client 114a or the mobile application 216 hosted on the second client 114b.

The first client 114a includes a processor 238, the communications module 226, and a memory 240 that includes the web application 214. The first client 114a also comprises an input device 242, such as a keyboard, mouse, and/or another suitable input device, and an output device 244, such as a display, port, transducer, and/or another suitable output device. The processor 238 of the first client 114a is configured to execute instructions, such as instructions physically coded into the processor 238, instructions received from software in the memory 240, instructions delivered from a remote memory, or a combination thereof. In general, the processor 238 of the first client 114a is configured to transmit information, such as data, requests, responses, and commands input to the input device 242, by the first end user 218, for example, to the recommendation service 210 on the one or more servers 110 via the web application 214. Similarly, the processor 238 of the first client 114a is also configured to receive information from the recommendation service 210 on the one or more servers 110 via the web application 214. The processor 238 of the first client 114a is configured to execute instructions from the web application 214 to communicate with a particular end user such as, for example, the second end user 220 via the second client 114b in a media session using a particular media such as, but not limited to, audio calls, video conferencing, screen sharing, real-time chat, and combinations thereof.

The second client 114b includes a processor 246, the communications module 228, and a memory 248 that includes the mobile application 216. The second client 114b also includes an input device 250, such as a touch screen, a keyboard, mouse, and/or another suitable input device, and an output device 252, such as a display, port, transducer, and/or another suitable output device. The second client 114b is configured to execute instructions, such as instructions physically coded into the processor 246, instruction received from software in the memory 248, instructions delivered from a remote memory, or a combination thereof. For example, the processor 246 of the second client 114b can be configured to transmit information, such as data, requests, responses, and commands input to the input device 250, by the second end user 220, for example, to the recommendation service 210 on the one or more servers 110 via the mobile application 216. Similarly, the processor 246 of the second client 114b can also be configured to receive information from the recommendation service 210 on the one or more servers 110 via the mobile application 216. The processor 246 of the second client 114b is configured to execute instructions from the mobile application 216 to communicate with the first end user 218 via the first client 114a, for example, in a media session using a particular media such as, but not limited to, audio calls, video conferencing, screen sharing, real-time chat, and combinations thereof.

The techniques described herein may be implemented as method(s) that are performed by physical computing device (s); as one or more non-transitory computer-readable storage media storing instructions which, when executed by computing device(s), cause performance of the method(s); or, as physical computing device(s) that are specially configured with a combination of hardware and software that causes performance of steps of the method(s).

FIG. 3A illustrates an example process 300A for recommending events during a media session between end users using the example one or more servers 110 of FIG. 2. While FIG. 3A is described with reference to the system 200 of FIG. 2, it should be noted that the process steps of FIG. 3A may be performed by other systems having more or fewer components as compared with the system 200 of FIG. 2.

The process 300A begins, after a media session 314 has been started, by proceeding to step 310 when the recommendation service 210 instructs the processor 230 of the one or more servers 110 to monitor communication streams 312 of the media session 314. At step 318, the recommendation service 210 instructs the processor 230 of the one or more servers 110 to processes data 320 of the communication streams 312. As depicted at step 321, the recommendation service 210 instructs the processor 230 of the one or more servers 110 to index content 316 identified from the data 320 of the communication streams that is processed during the media session 314. The recommendation service 210 instructs the processor 230 of the one or more servers 110 to analyze the data 320 of the communication streams 312 that is processed to detect at least one intent 322 and at least one entity 324, as illustrated at step 326.

At step 328, the recommendation service 210 instructs the processor 230 of the one or more servers 110 to determine, in response to detecting the at least one intent 322, whether the at least one intent 322 is a question 330 or at least one task 322. The recommendation service 210 instructs the processor 230 of the one or more servers 110 to identify, in response to determining that the at least one intent 322 is the question 330, presence information 334 associated with the at least one entity 324, as illustrated at step 336. At step 338, the recommendation service 210 instructs the processor 230 of the one or more servers 110 to transmit, during the media session 314, in response to determining that the at least one intent 322 is the question 330 and based on the presence information 334, an in-session recommendation 340 to selectively initiate an event 342 associated with the at least one entity 324. As depicted at step 344, the recommendation service 210 instructs the processor 230 of the one or more servers 110 to transmit, when the in-session recommendation 340 is selected to initiate the event 342, a request notification 346 to the at least one entity 324 to join the media session 314.

FIG. 3B illustrates an example process 300B, which can continue from step 328 of FIG. 3A, for recommending events during the media session 314 using the example one or more servers 110 of FIG. 2. While FIG. 3B is described with reference to the system 200 of FIG. 2, it should be noted that the process steps of FIG. 3B may be performed by other systems having more or fewer components as compared with the system 200 of FIG. 2.

The process 300B begins by proceeding to step 350, from step 328 of FIG. 3A, when the recommendation service 210 instructs the processor 230 of the one or more servers 110 to transmit, at an end of the media session 314 and based on detecting the at least one entity 324, a target recommendation 352 to selectively share the content 316 with the at least one entity 322. The recommendation service 210 instructs the processor 230 of the one or more servers 110 to transmit, when the at least one entity 324 is selected in the target recommendation 352, the content 316 to the at least one entity 324, as depicted at step 354.

An example process, such as a process including the process 300A and the process 300B of FIGS. 3A and 3B, respectively, will now be described in reference to example illustrations in FIGS. 4A-4D. For example, during the media session 314, such as a meeting in real-time, between the first end user 218, Joe (e.g., the host), on the first client 114a and the second end user 220, Mike, on the second client 114b, all of the communication streams 312 are monitored. The media session 314 can include a combination of audio, video, and screen share. Accordingly, all of the corresponding communication streams 312 are monitored. In certain scenarios, the media session 314 can be real-time chat.

During the media session 314, Joe and Mike may encounter a roadblock to their meeting that requires another person to resolve. For example, Joe may ask Mike "how does that operation work?" Mike may respond with "I don't know, but our manager, John, should know the answer." The disclosed system 200 detects "how does that operation work?" as an intent 322 and identifies the intent 322 as a question 330. The disclosed system 200 also detects "John" as an entity 324 associated with the intent 322. If John is identified as being available (e.g., the presence state 408 is available) based on his presence information 334, then, with reference to FIG. 4A, the in-session recommendation 340 is presented in real-time to the media session 314 and identifies that John is available and whether he should be invited to join the media session 314. In certain aspects, the in-session recommendation 340 is presented to Joe, as he is the host of the media session 314. In other types of media sessions, the in-session recommendation 340 may be presented in a different manner. For example, if the media session 314 is a phone call, then the in-session recommendation 340 may be presented to only internal users. If both Joe and Mike are internal users (e.g., the first client 114a hosts the web application 214 and the second client 114b hosts the mobile application 216), then the in-session recommendation 340 will be presented to both of them. On the other hand, if Joe is an internal user and Mike is an external user, then the in-session recommendation 340 will only be presented to Joe. As another example, if the media session 314 is a real-time chat, then the in-session recommendation 340 will only be presented to the sender of the intent 322.

The in-session recommendation 340 can also be based on other identified factors associated with John such as, but not limited to, presence information, zip code, time, zone, calendar information, skill level, topic of the media session, hierarchy, preferred communication, interests, past experience, and other factors. For example, if John is identified as being in a time zone that is in night time hours, sleeping hours, or non-business hours, then the disclosed system 200 will refrain from presenting an in-session recommendation 340 that recommends John to join the media session 314. As another example, if the calendar information indicates that John is currently in another meeting or otherwise occupied, then the disclosed system 200 will refrain from presenting an in-session recommendation 340 that recommends John to join the media session 314.

Figure 4B:
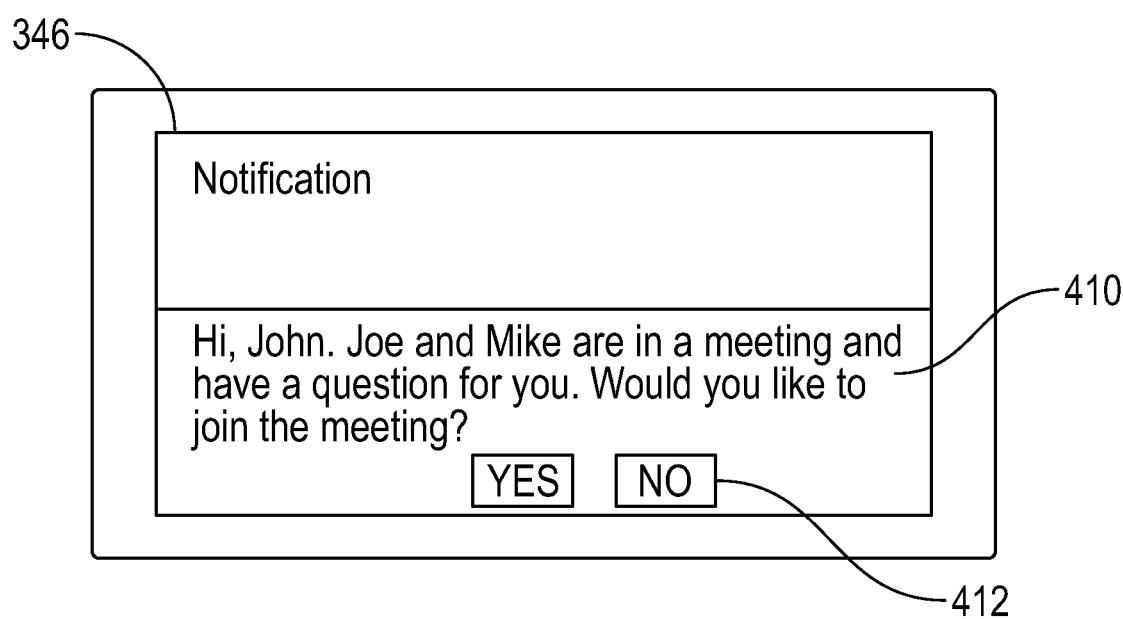

Moving forward with the main example above, the in-session recommendation 340 is presented to Joe, as host, and Joe accepts the recommendation to invite John to join the media session 314. John will then receive the request notification 346, as depicted in FIG. 4B. The request notification 346 can include the context 410 notifying John that "Joe and Mike are in a meeting and have a question for you." John is also presented with the option 412 in the request notification 346 to join the meeting or not join the meeting. In certain aspects, if John chooses, via the option 412, to not join the meeting, John can be presented with a pop-up to send a short message to Joe either within the media session 314 or externally of the media session 314.

Figure 4C:
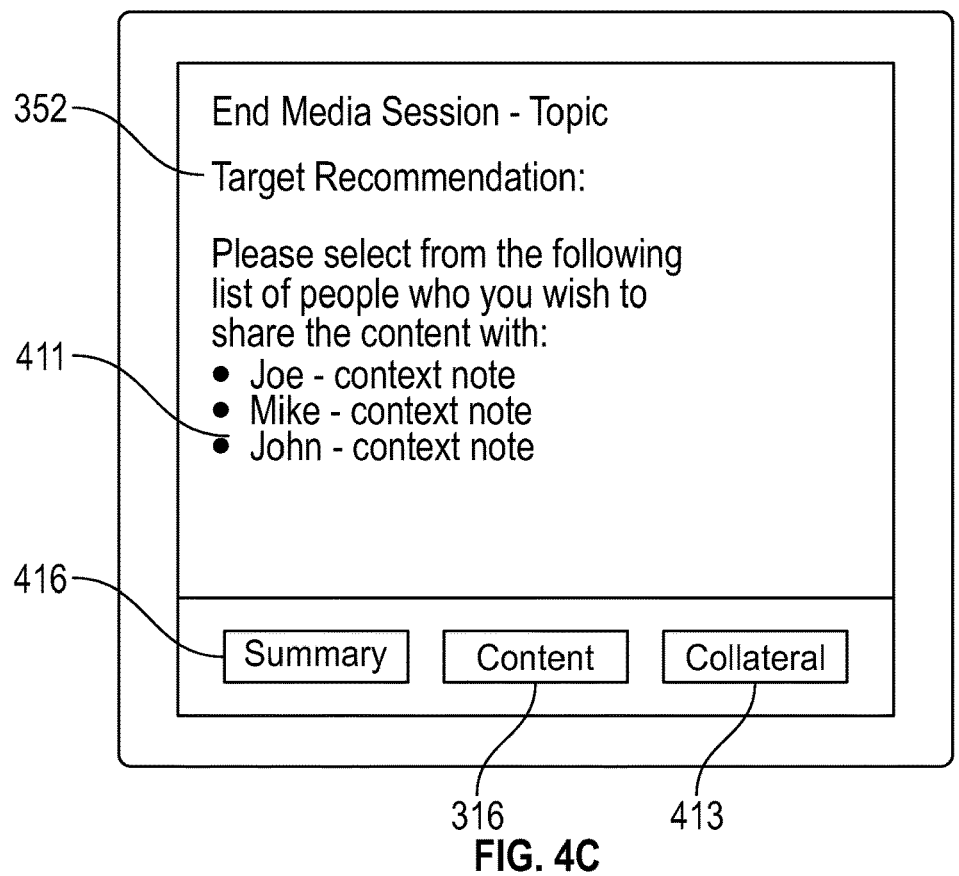

When John accepts the option 412 to join the media session 314 he will be joined to the media session 314 and can answer the question for Joe and Mike. Once the media session 314 has ended, the disclosed system 200 generates the target recommendation 352, as depicted in FIG. 4C. The generated target recommendation 352 can include the participants or entities 324 that were in the media session 314, such as Joe, Mike, and John, entities 324 who were invited to the media session 314, but did not join, and entities 324 who were mentioned or identified during the media session 314, such as John. In certain aspects, a context note 411 can be provided for each entity 324 listed in the target recommendation 352 with a brief explanation detailing relevant information associated with each entity 324 such as, but not limited to, hierarchy, skill level, and past experience. The target recommendation 352 can also include, as attachments, the content 316 that was shared during the media session 314, the summary 416 of the media session 314 identifying key moments and/or events, and collateral 413, such as a recording of the media session 314, In certain aspects, Joe has the option to select which attachments he wishes to share. As Joe is the host of the media session 314, the target recommendation 352 is presented to him at the end of the media session 314. Joe can then select who to share the content 316, the summary 416, and/or the collateral 413 with by selecting from the entities 324 listed in the target recommendation 352. In certain aspects, after Joe makes the selections, the content 316, the summary 416, and/or the collateral 413 is transmitted to the selected entities 324 via email.

Figure 4D:
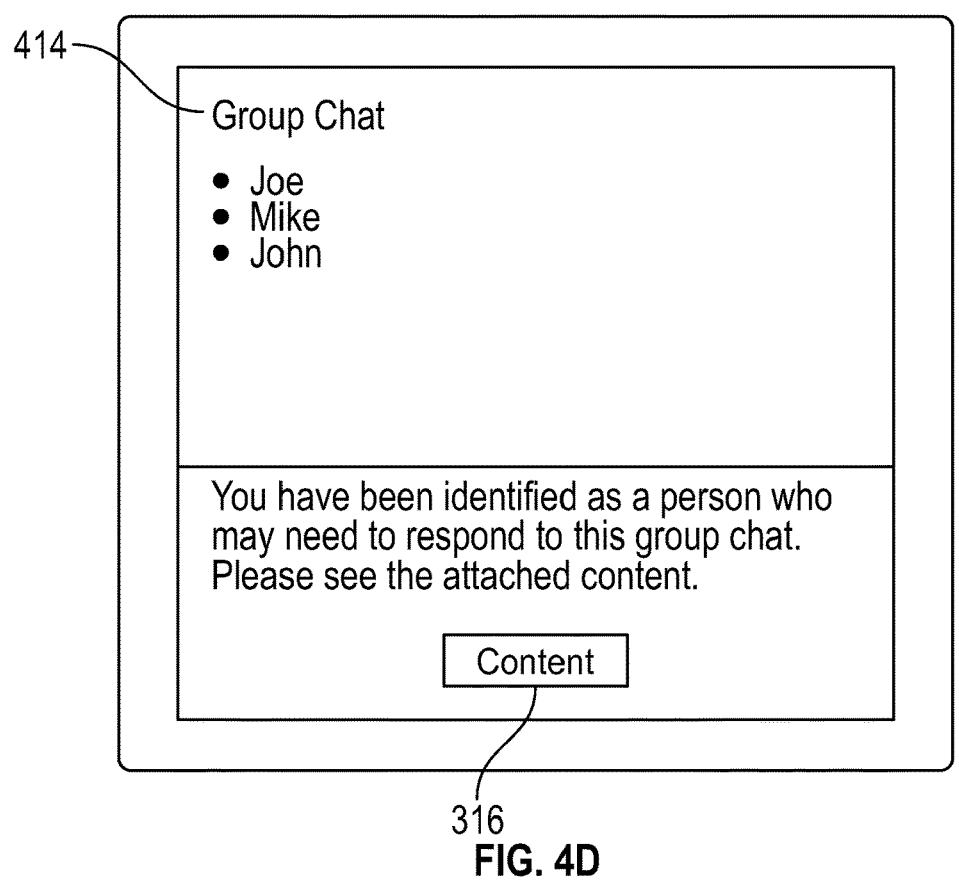

Additionally, or alternatively, in certain aspects, after the media session 314 has ended, the disclosed system 200 can generate the group chat 414, as depicted in FIG. 4D. The group chat 414 can include the participants or entities 324 that were in the media session 314, such as Joe, Mike, and John, entities 324 who were invited to the media session 314, but did not join, and entities 324 who were mentioned or identified during the media session 314, such as John. The group chat 414 can also include, as attachments, the content 316 that was shared during the media session 314, the summary 416 of the media session 314 identifying key moments and/or events, and collateral 413, such as a recording of the media session 314. In certain aspects, once the group chat 414 is active, the disclosed system 200 can monitor the communication streams 312 of the group chat 414 and transmit in-session recommendations 340 in a similar manner as described above. For example, when a text document is shared in the group chat 414, the disclosed system 200 can process the text document (e.g., convert to Portable Document Format (PDF)) and index the processed document. The disclosed system 200 can analyze the processed document, identify a question 330 in the processed document, and determine an entity who can answer the question 330. The disclosed system 200 can then generate and transmit an in-session recommendation 340 to invite the determined entity to join the group chat 414.

Hardware Overview

Figure 5:
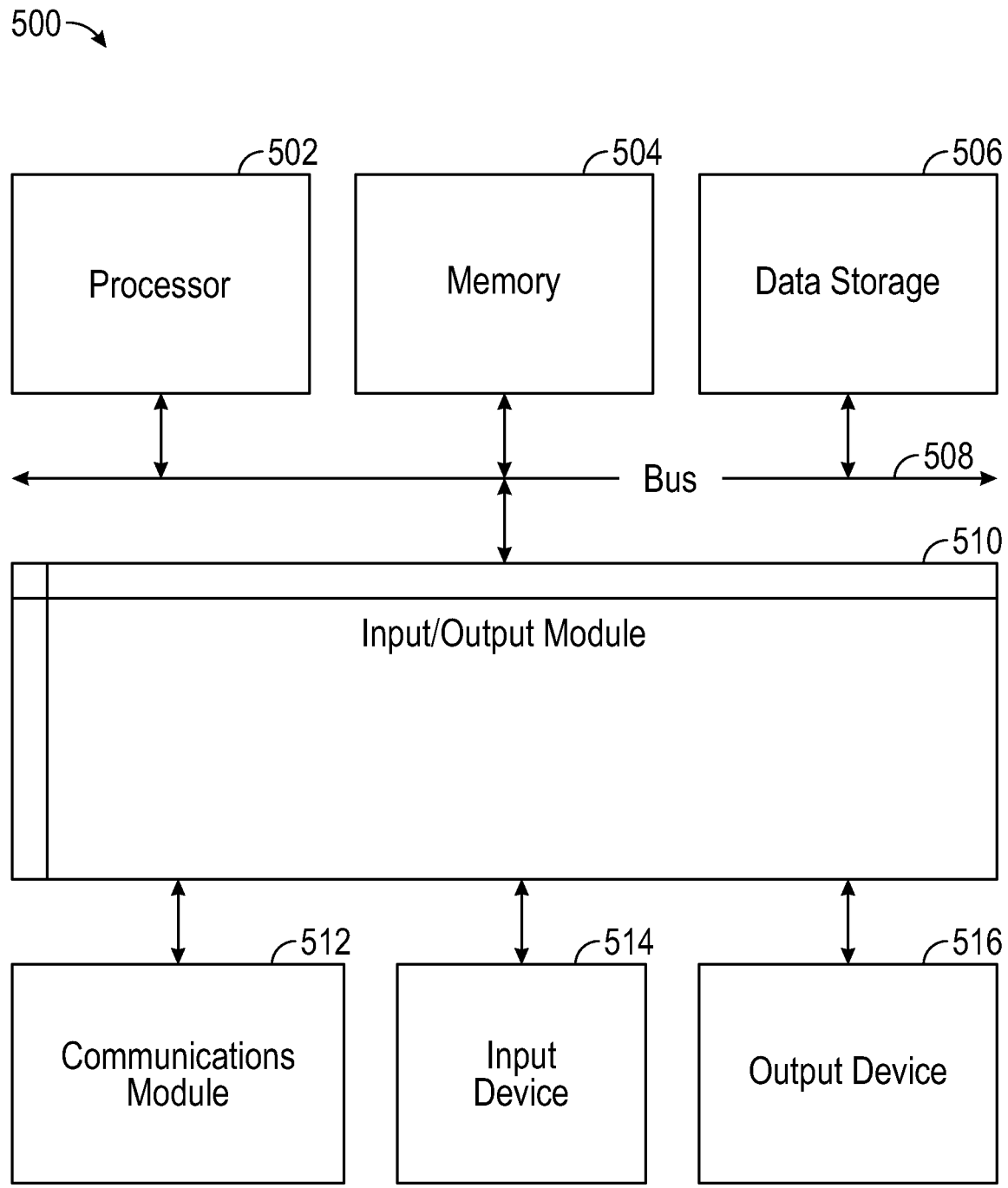
FIG. 5 is a block diagram illustrating an example computer system with which the servers and the first and second clients of FIG. 2 can be implemented.

FIG. 5 is a block diagram illustrating an example computer system 500 with which the one or more servers 110, the plurality of service servers 112, such as the service server 112*a*, and the one or more clients 114, such as the first client 114*a* and the second client 114*b*, of FIG. 2 can be implemented. In certain aspects, the computer system 500 may be implemented using hardware or a combination of software and hardware, either in a dedicated server, integrated into another computing component, or distributed across multiple computing components.

Computer system 500 (e.g., the one or more servers 110, the plurality of service servers 112, such as the service server 112*a*, and the one or more clients 114, such as the first client 114*a* and the second client 114*b*) may include a bus 508 and/or another suitable communication mechanism for communicating information, and one or more processors 502 (e.g., processor 230, 234, 238, 246) coupled with the bus 508 for processing information. According to one aspect, the computer system 500 can be a cloud-computing server of an IaaS that is able to support PaaS and SaaS services. According to an example embodiment, the computer system 500 is implemented as one or more special-purpose computing devices. The special-purpose computing device may be hard-wired to perform the disclosed techniques, and/or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques contemplated herein throughout. The special-purpose computing devices may be desktop computer systems, portable computer systems, handheld devices, networking devices, and/or any other device that incorporates hard-wired and/or program logic to implement the techniques. By way of example, the computer system 500 may be implemented with the one or more processors 502. The one or more processors 502 may comprise a general-purpose microprocessor, a microcontroller, a Digital Signal Processor (DSP), an ASIC, an FPGA, a Programmable Logic Device (PLD), a controller, a state machine, gated logic, discrete hardware components, or any other suitable entity that can perform calculations or other manipulations of information.

The computer system 500 may include, in addition to hardware, code that creates an execution environment for the computer program in question, e.g., code that constitutes processor firmware, a protocol stack, a database management system, an operating system, or a combination of one or more of them stored in an included memory 504 (e.g., memory 232, 236, 240, 248), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, and/or any other suitable storage device of combination of storage devices, coupled to the bus 508 for storing information and instructions to be executed by the one or more processors 502. The processor(s) 502 and the memory 504 can be supplemented by, or incorporated in, special purpose logic circuitry. Expansion memory may also be provided and connected to computer system 500 through input/output module 510, which may include, for example, a SIMM (Single In Line Memory Module) card interface. Such expansion memory may provide extra storage space for computer system 500, or may also store applications or other information for computer system 500. Specifically, expansion memory may include instructions to carry out or supplement the processes described above, and may further include secure information. Thus, for example, expansion memory may be provided as a security module for computer system 500, and may be programmed with instructions that permit secure use of computer system 500. In addition, secure applications may be provided via the SIMM cards, along with additional information, such as placing identifying information on the SIMM card in a non-hackable manner.

The instructions may be stored in the memory 504 and implemented in one or more computer program products, e.g., one or more modules of computer program instructions encoded on a computer-readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). The memory 504 may also be used for storing temporary variables or other intermediate information during execution of instructions to be executed by the processor(s) 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices (e.g., input device 242, 250 and output device 244, 252). The input/output module 510 can be any input/output module. Example input/output modules 510 include data ports such as USB ports. In addition, input/output module 510 may be provided in communication with the processor(s) 502, so as to enable near area communication of computer system 500 with other devices. The input/output module 510 may provide, for example, for wired communication in some implementations, or for wireless communication in other implementations, and multiple interfaces may also be used. The input/output module 510 is configured to connect to a communications module 512. The communications modules 512 (e.g., communications module 222, 224, 226, 228) may comprise networking interface cards, such as Ethernet cards and/or modems.

The components of the system can be interconnected by any form or medium of digital data communication, e.g., a communication network. The communication network (e.g., the network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, the communications module 512 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, the communications module 512 sends and receives electrical, electromagnetic, or optical signals that carry digital data streams representing various types of information. The network link typically provides data communication through one or more networks to other data devices. For example, the network link of the communications module 512 may provide a connection through a local network to a host computer or to data equipment operated by an Internet Service Provider (ISP). The ISP in turn provides data communication services through the world wide packet data communication network now commonly referred to as the "Internet." The local network and Internet both use electrical, electromagnetic, or optical signals that carry digital data streams. The signals through the various networks and the signals on the network link and through the communications module 512, which carry the digital data to and from the computer system 500, are example forms of transmission media.

The computer system 500 can send messages and receive data, including program code, through the network(s), the network link, and communications module 512. In the Internet example, a server might transmit a requested code for an application program through the Internet, the ISP, the local network, and the communications module 512. The received code may be executed by the processor(s) 502 as it is received, and/or stored in the data storage device 506 for later execution.

In certain aspects, the input/output module 510 is configured to connect to a plurality of devices, such as an input device 514 (e.g., input device 242, 250) and/or an output device 516 (e.g., output device 244, 252). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device.

According to one aspect of the present disclosure, the one or more servers 110 and the one or more clients 114, such as the first client 114a and the second client 114b can be implemented using the computer system 500 in response to the processor(s) 502 executing one or more sequences of one or more instructions contained in the memory 504. Such instructions may be read into the memory 504 from another machine-readable medium, such as the data storage device 506. Execution of the sequences of instructions contained in the memory 504 causes the processor(s) 502 to perform the process steps described herein. One or more processors in a multi-processing arrangement may also be employed to execute the sequences of instructions contained in the memory 504. The processor(s) 502 may process the executable instructions and/or data structures by remotely accessing the computer program product, for example by downloading the executable instructions and/or data structures from a remote server through the communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. For example, some aspects of the subject matter described in this specification may be performed on a cloud-computing environment. Accordingly, in certain aspects, a user of systems and methods as disclosed herein may perform at least some of the steps by accessing a cloud server through a network connection. Further, data files, circuit diagrams, performance specifications, and the like resulting from the disclosure may be stored in a database server in the cloud-computing environment, or may be downloaded to a private storage device from the cloud-computing environment.

As mentioned hereinabove, the computing system 500 may include clients and servers. A client and server are generally remote from each other and typically interact through a communication network. The relationship of client and server arises by virtue of computer programs running on the respective computers and having a client-server relationship to each other. The computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to the processor(s) 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as the data storage device 506. Volatile media include dynamic memory, such as the memory 504. Transmission media include coaxial cables, copper wire, and fiber optics, including the wires that include the bus 508. Common forms of machine-readable media include, for example, floppy disk, a flexible disk, hard disk, magnetic tape, any other magnetic medium, a CD- ROM, DVD, any other optical medium, punch cards, paper tape, any other physical medium with patterns of holes, a RAM, a PROM, an EPROM, al-LASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire, and fiber optics, including the wires that include bus 508. Transmission media can also take the form of acoustic or light waves, such as those generated during radio-wave and infra-red data communications. Furthermore, as used in this specification of this application, the terms "computer," "server," "processor," and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other aspects. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter. The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for recommending events during a media session between end users, the method comprising:
   monitoring, in a server, a communication stream of the media session between the end users;
   analyzing data of the communication stream of the media session to detect an intent of at least one of the end users, and an entity identified by at least one of the end users;
   determining, in response to detecting the intent of at least one of the end users, whether the intent of at least one of the end users is a question associated with the entity;
   identifying, in response to determining that the intent of at least one of the end users is the question, presence information associated with the entity;
   transmitting, to initiate an event associated with the entity during the media session between the end users, an in-session recommendation, in response to determining that the intent of at least one of the end users is the question associated with the entity, and based on the presence information of the entity;
   indexing content identified from the data of the communication stream of the media session between the end users; and
   transmitting, at an end of the media session between the end users and based on detecting the entity identified by at least one of the end users, a target recommendation to share the content with the end users of the media session and the entity.

2. The computer-implemented method of claim 1, further comprising:
   transmitting, when the in-session recommendation is selected to initiate the event associated with the entity, a request notification to the entity to join the media session.

3. The computer-implemented method of claim 2, wherein the request notification comprises a context, based on the intent of at least one of the end users, when requesting the entity to join the media session.

4. The computer-implemented method claim 2, wherein the request notification comprises an option for the entity to respond to the request notification instead of joining the media session.

5. The computer-implemented method of claim 1, further comprising:
   processing the data of the communication stream; and
   indexing the data of the communication stream that is processed.

6. The computer-implemented method of claim 1, wherein determining whether the intent of at least one of the end users is the question is performed with natural language processing.

7. The computer-implemented method of claim 1, wherein transmitting the in-session recommendation to initiate the event associated with the entity is based on identifying that the presence information indicates a presence state of available for the entity.

8. The computer-implemented method of claim 1, wherein the media session is conducted via one of audio, video, screen share, audio and video, audio and screen share, video and screen share, and real-time chat.

9. The computer-implemented method of claim 1, further comprising:
   transmitting, when the entity is selected in the target recommendation, the content to the entity.

10. The computer-implemented method of claim 1, further comprising:
    generating, at the end of the media session and based on detecting the entity identified by the at least one of the end users, a group chat comprising the end users of the media session and the entity; and
    transmitting the content to the group chat.

11. The computer-implemented method of claim 1, wherein the target recommendation comprises a summary of the media session detailing key moments identified from analyzing the data of the communication stream.

12. A system for recommending events during a media session between end users, the system comprising:
    a memory comprising instructions; and
    one or more processors configured to execute the instructions to:
    monitor, in a server, a communication stream of the media session between the end users;
    process a data of the communication stream of the media session;
    index content identified from the data of the communication stream that is processed during the media session between the end users;
    analyze the data of the communication stream of the media session that is processed to detect an intent of at least one of the end users, and an entity identified by at least one of the end users;
    determine, in response to detecting the intent of at least one of the end users, whether the intent of at least one of the end users is a question associated with the entity;
    identify, in response to determining that the intent of at least one of the end users is the question, presence information associated with the entity;
    transmit an in-session recommendation to initiate an event associated with the entity during the media session between the end users in response to determining that the intent of at least one of the end users is the question associated with the entity, and based on the presence information of the entity;

transmit, at an end of the media session between the end users and based on detecting the entity identified by at least one of the end users, a target recommendation to share the index content with the end users of the media session and the entity;

generate, at the end of the media session and based on detecting the entity identified by at least one of the end users, a group chat comprising the end users of the media session and the entity; and transmit the index content to the group chat.

13. The system of claim 12, wherein the one or more processors is further configured to execute the instructions to:

transmit, when the in-session recommendation is selected to initiate the event associated with the entity, a request notification to the entity to join the media session.

14. The system of claim 12, wherein the one or more processors is further configured to execute the instructions to:

transmit, when the entity is selected in the target recommendation, the index content to the entity.

15. The system of claim 12, wherein the instructions to determine whether the intent of at least one of the end users is the question, is performed via natural language processing.

16. The system of claim 12, wherein the target recommendation comprises a summary of the media session detailing key moments identified from analyzing the data of the communication stream.

17. A non-transitory machine-readable storage medium comprising machine-readable instructions for causing a processor to execute operations for recommending events during a media session between end users, the operations comprising:

monitoring, from a server, a communication stream of the media session between the end users;

processing, in the server, a data of the communication stream of the media session;

indexing content identified from the data of the communication stream of the media session that is processed during the media session between the end users;

analyzing the data of the communication stream that is processed to detect at an intent of at least one of the end users, and an entity identified by at least one of the end users;

determining, in response to detecting the intent of at least one of the end users, whether the intent of at least one of the end users is a question;

identifying, in response to determining that the intent of at least one of the end users is the question, presence information associated with the entity;

transmitting, from the server, an in-session recommendation to initiate an event associated with the entity during the media session between the end users in response to determining that the intent of at least one of the end users is the question associated with the entity, and based on the presence information of the entity;

transmitting, when the in-session recommendation is selected to initiate the event associated with the entity, a request notification to the entity to join the media session;

transmitting, at an end of the media session between the end users and based on detecting the entity identified by at least one of the end users, a target recommendation to share the content with the end users of the media session and the entity;

generating, at the end of the media session and based on detecting the entity identified by the at least one of the end users, a group chat comprising the end users of the media session and the entity; and transmitting the content to the group chat.

* * * * *